United States Patent [19]

Pleibel et al.

[11] Patent Number: 4,529,426
[45] Date of Patent: Jul. 16, 1985

[54] METHOD OF FABRICATING HIGH BIREFRINGENCE FIBERS

[75] Inventors: William Pleibel, Aberdeen; Jay R. Simpson, Fanwood; Rogers H. Stolen, Rumson, all of N.J.

[73] Assignee: AT&T Bell Laboratories, Murray Hill, N.J.

[21] Appl. No.: 516,000

[22] Filed: Jul. 22, 1983

[51] Int. Cl.³ .......................................... C03B 37/075
[52] U.S. Cl. ...................... 65/3.11; 65/3.2; 65/102
[58] Field of Search .................. 65/3.2, 3.1, 3.11, 102, 65/108; 264/1.5, 2.7; 350/96.3, 96.33

[56] References Cited

U.S. PATENT DOCUMENTS

| | | | |
|---|---|---|---|
| 3,802,859 | 4/1974 | Schenkels | 65/108 |
| 3,982,916 | 9/1976 | Miller | 65/3 |
| 4,106,847 | 8/1978 | Arnaud | 350/96.31 |
| 4,184,859 | 1/1980 | Maklad | 65/2 |
| 4,274,854 | 6/1981 | Pleibel et al. | 65/2 |
| 4,360,371 | 11/1982 | Blankenship et al. | 65/3.12 |
| 4,426,129 | 1/1984 | Matsumura et al. | 65/3.11 |

FOREIGN PATENT DOCUMENTS 136605  8/1982  Japan .................... 65/3.11

Primary Examiner—S. Leon Bashore
Assistant Examiner—Michael K. Boyer
Attorney, Agent, or Firm—Wendy W. Koba

[57] ABSTRACT

The present invention relates to a technique for producing polarization-preserving and single polarization optical fibers. As disclosed, high birefringence is introduced into the preform by deforming the fiber preform such that a cladding layer becomes flat and highly conformable, while the core remains hard and substantially round. In particular, a cladding layer with a relatively low melting point is utilized such that when the preform is heated the cladding becomes liquified while the core remains solid. The preform may then be deformed so that the cladding layer is substantially flattened. Standard drawing techniques may then be utilized to form polarization-preserving fibers and single polarization fibers from the preform.

24 Claims, 9 Drawing Figures

METHOD OF FABRICATING HIGH BIREFRINGENCE FIBERS

BACKGROUND OF THE INVENTION

1. Field of the Invention

The present invention relates to a method of fabricating high birefringence optical fibers and, more particularly, to a method wherein an optical fiber preform comprising a circular core and circular cladding regions is heated and deformed such that the circular cladding layers obtain a high degree of ellipticity.

2. Description of the Prior Art

Optical waveguides capable of transmitting power with only one direction of polarization are desirable in many different applications, such as fiber sensors, inline fiber devices, Raman lasers, and the like. A variety of structures now exist for introducing birefringence into optical fiber preforms to make polarization-preserving optical fibers. In most of the arrangements, differential stress is introduced in the core by way of an elliptical stress cladding, stress in an elliptical core or isolated stress lobes. Polarization-preserving fiber also utilize geometrical birefringence from a noncircular core or from index side-pits next to the core. These structures are made by a variety of techniques which include grinding the preform before and after deposit and collapse, pressure differential during collapse, rod and tube techniques, or etching.

One method of preform fabrication is disclosed in U.S. Pat. No. 3,982,916 issued to S. E. Miller on Sept. 28, 1976, which relates to a process for manufacturing preforms using the known chemical vapor deposition (CVD) process. As disclosed, the method relates to a process where clad optical fibers having longitudinal, eccentric, azimuthal index homogeneities are drawn. In particular, the CVD process for making preforms is modified by the use of asymmetric heating to produce circumferentially alternating deposits of doped and undoped glass which act as the fiber core when the preform is subsequently collapsed and drawn into a fiber.

A method of fabricating an elliptical core single mode optical fiber is disclosed in U.S. Pat. No. 4,184,859 issued to M. S. Maklad on Jan. 22, 1980. In this process, a multi-layered preform of circular cross-section is subject to partial collapse, first on one side of the preform and then on the other, until an elliptically shaped preform is obtained. The preform is then collapsed to obtain a cylindrical outer shape, where the ellipticity of the core and central cladding layers is maintained. The fiber is then drawn down by any of the known methods, and a round fiber is achieved which includes an elliptical core.

An alternative prior art method of obtaining a fiber which utilizes stress-induced birefringence to obtain single-mode guiding is disclosed in U.S. Pat. No. 4,360,371 issued to M. G. Blankenship et al on Nov. 23, 1982. Here, a hollow intermediate product is formed by depositing layers of cladding and core glass on the inner surface of a substrate tube. Opposite sides of the intermediate product are heated to cause it to collapse into a solid preform foreproduct having an oblong cross-section. A layer of flame hydrolysis-produced soot having a circular outer surface is deposited on the preform foreproduct and is consolidated to form a dense glass cladding layer thereon. The temperature coefficient of expansion of the outer cladding layer is different from that of the preform foreproduct on which it is deposited so that when the resultant preform is drawn into a fiber, a stress-induced birefringence exits in the core.

An alternative method of fabricating a polarization-preserving optical fiber capable of producing a stress-induced birefringence therein is disclosed in U.S. Pat. No. 4,274,854 issued to W. Pleibel et al on June 23, 1981. The method as disclosed has a first step of fabricating a substrate tube to have a wall of nonuniform thickness, the nonuniformity in thickness being arranged about the wall of the substrate tube so that maxima and minima in wall thickness lie in planes which are substantially orthogonal. This first step is followed by deposition of cladding layers and a core layer within the substrate tube. The substrate is then collapsed and the fiber drawn therefrom. The nonuniform wall thickness of the substrate tube translates into elliptical stress cladding, where this cladding operates with differential thermal contraction of the layers to produce stress-induced birefringence in the fiber, which birefringence provides a polarization-preserving optical fiber.

The above-described prior art arrangements all require a large number of fabricating steps, where inconsistencies in the drawn fiber may be introduced at each step, resulting in a drawn fiber which is not as highly birefringent as is necessary for many fiber optic applications. Also, many of the above-described methods are not compatible with existing optical fiber manufacturing facilities and require additional fabrication to produce polarization-preserving fibers.

SUMMARY OF THE INVENTION

The present invention addresses itself to the need remaining in the prior art and relates to a new technique for forming high birefringence polarization-preserving optical fibers by heating and deforming the fiber preform such that the circular cladding layers become highly elliptical while the core remains essentially circular.

It is an aspect of the present invention to provide a polarization-preserving optical fiber which is easy to manufacture, requiring only heating and deformation of the preform, and may easily be included in standard techniques for fabricating optical fibers.

Another aspect of the present invention is to provide an optical fiber which is comparatively flat in cross-section, where these flat fibers may be bent without introducing polarization cross-coupling in the fiber since bending will be along a principal axis of the fiber and, therefore, will not modify the local orientation of the principal axes. The flat profile also allows for the polarization axes to be determined from inspection of the fiber.

Other and further aspects of the present invention will become apparent during the course of the following description and by reference to the accompanying drawings.

BRIEF DESCRIPTION OF THE DRAWINGS

Referring now to the drawings, where like numerals represent like parts in several views.

DETAILED DESCRIPTION

Figure 1:
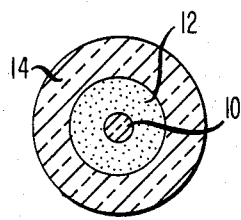
FIG. 1 illustrates a cross-sectional view of a circular fiber preform prior to the operation of the present invention.

Referring now to the drawings, FIG. 1 illustrates a cross-sectional view of an optical fiber preform prior to the application of the present invention. As shown, the preform comprises a core region 10, an inner cladding layer 12 and a silica substrate region 14 surrounding inner cladding layer 12. In accordance with the present invention, various materials may be utilized to form the core region and the cladding layers, where the usage of particular materials is determined in relation to the type of final fiber desired. For example, a polarization-preserving fiber will utilize different materials than a single-polarization fiber, where these differences will be discussed in greater detail hereinafter. Primarily, in accordance with the present invention, the cladding layer or layers must be formed with a material having a lower melting point than the material used for the core region, so that the core will stay substantially hard and round during the heating and deformation process.

Figure 2:
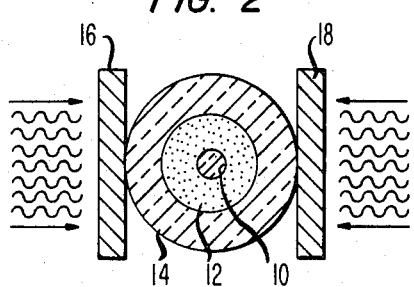
FIG. 2 illustrates the optical fiber preform heating and deformation processes of the present invention.

The preform shaping process of the present invention is illustrated in FIG. 2. In accordance with the present invention, a localized portion of the preform is initially heated to a temperature at which silica substrate region 14 begins to soften. Since cladding layer 12 has a much lower melting point than silica substrate region 14, cladding layer 12 will be substantially liquified when substrate region 14 begins to soften. Core region 10, since it has a higher melting point than cladding layer 12 and is removed from the source of the heat, will maintain its circular cross-sectional shape during the heating process. Once silica substrate region 14 has begun to soften, the preform is deformed in a manner which will result in inner cladding layer 12 being highly flattened. As shown in FIG. 2, one method of deforming the preform is squeezing the preform with a pair of metal plates 16 and 18. It is to be noted that the preform is to be deformed in such a manner that silica substrate region 14 is squeezed with an equal force on opposite sides, yielding a preform which comprises substantially flat sidewalls.

Automated preform shaping may be accomplished by mounting metal plates 16 and 18 on arms which swivel in and out of the hot zone surrounding the preform. The arms may be driven by pneumatic pistons actuated by contacts on a glass lathe. In accordance with the present invention, the fiber length which is heated and squeezed should be matched with the length of the plate. If the heated preform area is shorter than the plate size, cracks in the preform structure may result, while if the heated region of the preform is much longer than the plate size, the preform may sag. It is to be noted that in order to keep metals from depositing on the fiber, plates 16 and 18 may be water-cooled. Alternatively, plates 16 and 18 may be formed from, for example, carbon or fused silica, where these materials do not exhibit the deposition problems of the metal.

Figure 3:
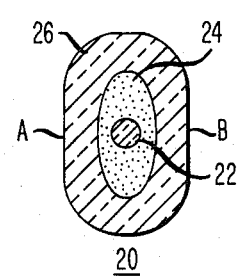
FIGS. 3–5 illustrate cross-sectional views of three exemplary optical fiber preforms formed in accordance with the present invention.
Figure 4:
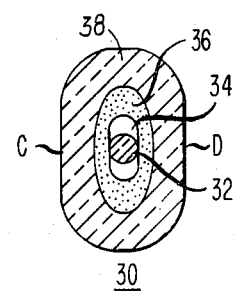
Figure 5:
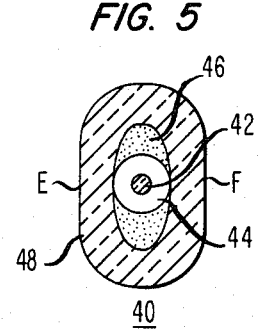

Cross-sectional views of three exemplary optical fiber preforms formed using the technique of the present invention are illustrated in FIGS. 3–5. As shown in FIG. 3, a first preform 20 comprises a round index-doped core region 22 and an extremely elliptical stress cladding 24 and substrate 26. In accordance with the present invention, sidewalls A and B of preform 20 are substantially flat due to the heating and squeezing process. A second preform 30 illustrated in FIG. 4 comprises an alternative composition, including a silica core 32, an elliptical inner cladding layer 34, a fluorine-doped outer cladding layer 36 and a substrate 38. Like first preform 20, sidewalls C and D of preform 30 have been flattened somewhat from the process of the present invention. Lastly, as shown in FIG. 5, a preform 40 comprises an index-doped core region 42, a circular barrier layer 44, a stress cladding layer 46 which touches barrier layer 44, and a substrate 48. Since barrier layer 44 is formed from silica, it will not soften during the heating process and, therefore, will not be deformed when the preform is squeezed. Sidewalls E and F of preform 40, like the sidewalls of preforms 20 and 30 are also somewhat flattened.

In drawing the final fiber from a preform formed in accordance with the present invention, a method must be employed that does not allow the fiber to round out as it is heated and drawn down. The most important parameter to be considered is the drawing tension, which is directly related to the drawing temperature and drawing speed. It has been found that fibers drawn at less than 5 grams of tension usually lose most of the ellipticity that has been imparted to the preform. At approximately 10 grams of tension, the silica substrate region begins to become fairly round, while the cladding layers remain somewhat elliptical in cross-section. Fibers pulled above 20 grams of tension tend to round out only slightly, and fibers pulled with 50 grams of tension exhibit no appreciable rounding.

Figure 6:
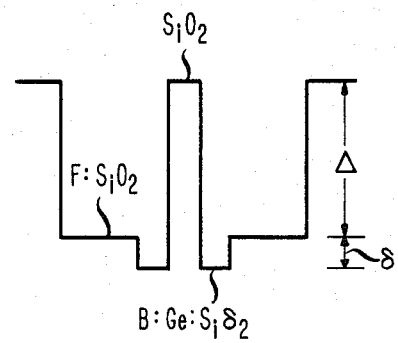
FIGS. 6–9 illustrate refractive index profiles of a plurality of optical fibers drawn from a preform formed in accordance with the present invention.
Figure 7:
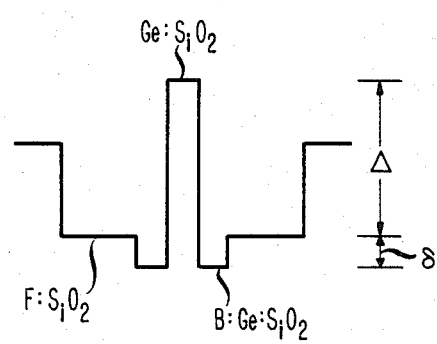
Figure 8:
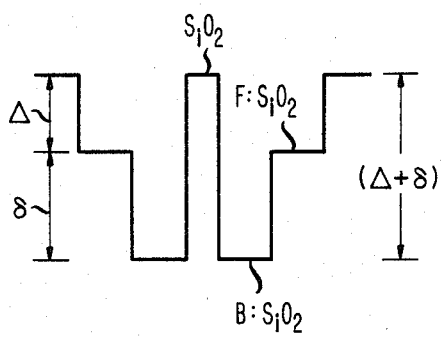
Figure 9:
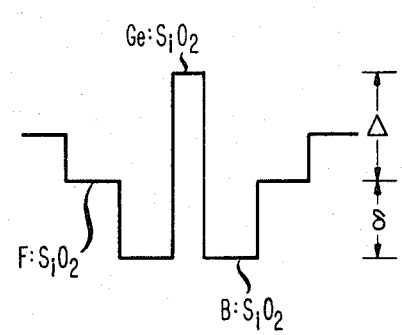

Refractive index profiles for an exemplary set of optical fibers formed in accordance with the present invention are illustrated in FIGS. 6–9, which illustrates index profiles for both polarization-preserving fibers (FIGS. 6 and 7) and single-polarization fibers (FIGS. 8 and 9). FIG. 6 illustrates the refractive index profile for a polarization-preserving fiber which comprises a silica core, a boron and germanium-doped inner cladding layer, and a fluorine-doped outer cladding layer. The index difference between the core and the fluorine-doped cladding is denoted by $\Delta$. The index difference between the inner and outer cladding is much less than $\Delta$ and is denoted by $\delta$. A similar profile is illustrated in FIG. 7, where the core region is this example is germanium-doped silica (i.e., an index-doped core). Here, the index difference between the core region and the surrounding substrate is lessened, due to the presence of the germanium in the core, but the overall $\Delta$ is the same as that illustrated in FIG. 6. The refractive index profile for a single-polarization fiber formed in accordance with the present invention is illustrated in FIG. 8. As shown, the core region comprises silica, the inner cladding layer comprises boron-doped silica, and the outer cladding layer comprises fluorine-doped silica. In contrast to the profiles illustrated in FIGS. 6 and 7, the doping of the inner cladding layer with only boron allows for a $(\Delta + \delta)$ which is much larger than for the polarization preserving fiber. Also, as seen by reference to FIG. 8, $\Delta$ is less and $\delta$ is greater than for the polarization preserving fiber. The same factor of $(\Delta + \delta)$ as shown in FIG. 8 is exhibited in the refractive index profile illustrated in FIG. 9, where here the silica core is replaced with a germanium-doped core. It is to be noted that the outer cladding layer of fluorine-doped silica is needed for only those fibers which have a pure silica core and a silica substrate tube. However, a fluorine-doped silica layer is also often used in fibers which have germanium-doped cores, because a circular core can be achieved more easily by using relatively low core-dopant concentrations. Further, the germanium may be replaced by phosphorous to form other structures in accordance with the process of the present invention.

An additional advantage of the present invention is the usefulness of the noncircular outer shape of the drawn fiber. The flat profile allows for the principal axes to be easily located. Further, the fiber tends to bend along only one axis so that bending perturbations will not cause polarization cross-coupling, since these perturbations introduce birefringence only along the existing principal axes.

What is claimed is:

1. A method of making an optical fiber preform comprising the steps of
   (a) providing a solid optical fiber preform which comprises a substantially circular inner core region and a surrounding highly-doped cladding region with a lower melting point than said inner core region;
   (b) heating a localized area of said preform until said localized area begins to soften; and
   (c) deforming said localized area using external mechanical means to flatten said highly-doped cladding region while allowing said inner core region to remain substantially circular.

2. The method according to claim 1 wherein in performing step (c) the highly-doped cladding region is deformed to obtain an elliptical cross-section, touching the inner core region in the narrow dimension.

3. The method according to claim 1 wherein step (c) includes applying a pressure on opposite sides of the optical preform to flatten said optical fiber preform.

4. The method according to claim 1 wherein in performing step (a) the inner core region comprises $SiO_2$ and the highly-doped cladding region comprises boron-doped and germanium-doped $SiO_2$.

5. The method according to claim 1 wherein in performing step (a) the inner core region comprises $SiO_2$ and the highly-doped cladding region comprises boron-doped and phosphorous-doped $SiO_2$.

6. The method according to claim 1 wherein in performing step (a) the inner core region comprises germanium-doped $SiO_2$ and the highly-doped cladding region comprises boron-doped and germanium-doped $SiO_2$.

7. The method according to claim 1 wherein in performing step (a) the inner core region comprises phosphorous-doped $SiO_2$ and the highly-doped cladding region comprises boron-doped and phosphorous-doped $SiO_2$.

8. The method according to claim 1 wherein in performing step (a) the inner core region comprises $SiO_2$ and the highly-doped cladding region comprises boron-doped $SiO_2$.

9. The method according to claim 1 wherein in performing step (a) the inner core region comprises germanium-doped $SiO_2$ and the highly-doped cladding region comprises boron-doped $SiO_2$.

10. The method according to claim 1 wherein in performing step (a) the inner core region comprises phosphorous-doped $SiO_2$ and the highly-doped cladding region comprises boron-doped $SiO_2$.

11. The method according to claim 1 wherein in performing step (a) the inner core region comprises a doped silica core and a light guiding silica barrier layer surrounding said doped silica core.

12. The method according to claim 1 wherein in performing step (a) the inner core region comprises a doped silica core and a light guiding flourine-doped silica barrier layer surrounding said doped silica core.

13. A method of making an optical fiber comprising the steps of:
   (a) providing a solid optical fiber preform which comprises a substantially circular inner core region and a surrounding highly-doped cladding region with a lower melting point than said inner core region;
   (b) heating a localized area of said optical fiber preform until said localized area begins to soften;
   (c) deforming said localized area of said optical fiber preform using external mechanical means to flatten said highly-doped cladding region while allowing the inner core region to remain essentially circular;
   (d) repeating steps (b) and (c) to subsequent localized areas of said optical fiber preform; and
   (e) drawing the optical fiber from said preform using a predetermined tension that maintains the deformation preformed in step (c).

14. The method according to claim 13 wherein in performing step (c), the highly-doped cladding region is deformed to obtain an elliptical cross-section, touching the inner core region along the narrow dimension.

15. The method according to claim 13 wherein step (c) includes applying a pressure on opposite sides of the optical fiber preform.

16. The method according to claim 13 wherein in performing step (a) the inner core region comprises $SiO_2$ and the highly-doped cladding region comprises boron-doped and germanium-doped $SiO_2$.

17. The method according to claim 13 wherein in performing step (a) the inner core region comprises $SiO_2$ and the highly-doped cladding region comprises boron-doped and phosphorous-doped $SiO_2$.

18. The method according to claim 13 wherein in performing step (a) the inner core region comprises germanium-doped $SiO_2$ and the highly-doped cladding region comprises boron-doped and germanium-doped $SiO_2$.

19. The method according to claim 13 wherein in performing step (a) the inner core region comprises phosphorous-doped $SiO_2$ and the highly-doped cladding region comprises boron-doped and phosphorous-doped $SiO_2$.

20. The method according to claim 13 where in performing step (a) the inner core region comprises $SiO_2$ and the highly-doped cladding region comprises boron-doped $SiO_2$.

21. The method according to claim 13 wherein in performing step (a) the inner core region comprises germanium-doped $SiO_2$ and the highly-doped cladding region comprises boron-doped $SiO_2$.

22. The method according to claim 13 wherein in performing step (a) the inner core region comprises phosphorous-doped $SiO_2$ and the highly-doped cladding region comprises boron-doped $SiO_2$.

23. The method according to claim 13 wherein in performing step (a) the inner core region comprises a doped silica core and a light guiding silica barrier layer surrounding said doped silica core.

24. The method according to claim 13 wherein in performing step (a) the inner core region comprises a doped silica core and a light guiding flourine-doped silica barrier layer surrounding said doped silica core.

* * * * *